3,753,936
BRANCHED RUBBERY BLOCK
COPOLYMER ADHESIVE
Oren L. Marrs, Bartlesville, Okla., assignor to
Phillips Petroleum Company
No Drawing. Continuation-in-part of abandoned application Ser. No. 12,452, Feb. 18, 1970. This application July 14, 1971, Ser. No. 162,684
Int. Cl. C09j 3/26
U.S. Cl. 260—27 R   12 Claims

ABSTRACT OF THE DISCLOSURE

A pressure-sensitive adhesive suitable for application in the form of a solution, dispersion, or emulsion is provided which comprises, as the sole rubbery polymer present in the formulation, a branched rubbery block copolymer of conjugated dienes and vinyl aromatic hydrocarbons, having terminal resinous blocks, and a conjugated diene/vinyl aromatic hydrocarbon ratio range of from 60/40 to 80/20.

This is a continuation-in-part of my prior copending application Ser. No. 12,452, filed Feb. 18, 1970, and now abandoned.

This invention relates to a new adhesive composition. More specifically, this invention relates to a cementing or adhesive composition comprising a branched block copolymer in an organic solvent, aqueous dispersion or emulsion and a method for using said composition in bonding surfaces together.

Many adhesive and cementing compositions have been suggested in the art for bonding materials such as rubber, wood, metal, ceramics, glass, plastic, paper, fabric and the like, to each other or to other materials. The majority of the polymers developed by the prior art leave much to be desired, particularly in relation to bonding strength or creep resistance and lap shear strength, especially at temperatures above room temperature.

An object of this invention is to provide a high bonding strength, creep-resistant adhesive composition.

Another object of this invention is to provide an adhesive composition having improved lap shear strength.

Other aspects, objects and advantages of the invention will be apparent to those skilled in the art from a careful study of the disclosure and the appended claims.

In accordance with the present invention, I have discovered that adhesive compositions having outstanding heat resistance, lap shear strength, creep resistance and satisfactory tack and peel strength properties are obtained by employing as the sole polymer in the adhesive compositions certain rubbery branched or radial block copolymers of conjugated dienes and vinyl aromatic hydrocarbons.

More specifically, I have discovered that satisfactory polymer-containing adhesive compositions in the form of a latex or cement can be formulated using as the sole rubbery polymer therein a radial or branched-chain block copolymer when the branched-chain block copolymer is that formed from a conjugated diene and a vinyl aromatic hydrocarbon having a weight ratio of conjugated diene to vinyl aromatic hydrocarbon in the range of from 60/40 to 80/20 and preferably from 60/40 to 70/30.

The branched or radial rubbery block polymers employed as the sole rubbery polymer of this invention can be depicted as $(A-B)_xY$ type polymers wherein A represents nonelastomers polymer blocks, or segments, and B represents elastomers polymer segments. Y is an atom or group of atoms derived from a polyfunctional treating agent used in the formation of the radial polymers, and $x$ is an integer of at least 3 and can be equal to the number of functional groups of said polyfunctional treating agent.

The radial block polymer thus can be characterized as having at least three polymer branches with each branch of the radial block polymer comprising terminal nonelastomeric segments. The branches of the radial block polymer contain a terminal nonelastomeric segment attached to an elastomeric polymer segment.

The radial block polymers employed in accordance with this invention can be prepared by conventional methods known to the art. Examples of such methods are disclosed in U.S. Pat. 3,281,383, issued to Zelinski et al., Oct. 25, 1966.

One convenient way of forming the branched block copolymers used in the adhesive composition of this invention is by polymerizing the vinyl-substituted aromatic compound in the presence of an organomonolithium initiator. After the vinyl-substituted aromatic compound has been polymerized to form the initial polymer block, the conjugated diene can be added to the polymerization mixture to produce a block copolymer of the conjugated diene and the vinyl-substituted aromatic compound. By following the procedure of polymerizing the vinyl-substituted aromatic compound first, followed by the addition of the conjugated diene compound, a block copolymer having a terminal lithium atom is formed. The lithium atom will be at the end of the conjugated diene polymer block. The lithium-terminated block copolymer is called a "living polymer" because of the presence of the lithium atom at the end of the conjugated diene polymer block. The living polymer then can be conveniently reacted with a polyfunctional compound having at least three reactive sites capable of reacting with the carbon-lithium bond of the living polymer. By regulating the amounts of the living polymer and the amounts of the polyfunctional compound, it is possible to produce a branched block copolymer having at least three relatively long polymer branches extending outwardly from the nucleus. The nucleus or hub is formed by the polyfunctional compound which reacted with the lithium-terminated polymer. In order to produce the branched block copolymers having at least three polymer branches, it is essential that the polyfunctional compound have at least three reactive sites capable of reacting with the carbon-lithium bond of the living polymer.

To achieve maximum branching, the optimum amount of polyfunctional compound reacted with the living polymer will be an amount of polyfunctional compound that contains one equivalent of treating agent for each living polymer molecule. In other words, each reactive site on the polyfunctional compound will react with a carbon-lithium bond in the living polymer. Larger amounts of the polyfunctional compound encourage the production of polymers that are coupled in a linear configuration instead of being branched. When equivalent amounts of the polyfunctional compound and the living polymer are reacted, the final product comprises a branched polymer in which the polymer chain is joined at one end to each reactive site of the treating agent.

Since the branched block copolymers used in the adhesive composition of this invention preferably contain terminal homopolymer blocks of the vinyl-substituted aromatic compound, it is necessary that the vinyl-substituted aromatic compound be polymerized first when an organomonolithium initiator is used to form the block copolymer. Then, after the vinyl-substituted aromatic compound has been polymerized to the desired length, any unreacted vinyl-substituted aromatic compound can be removed. The conjugated diene is then added to the polymerization mixture, and the polymerization is continued until the conjugated diene has been polymerized to the desired amount. Then the living polymer of the vinyl-substituted aromatic compound and the conjugated diene can be reacted with the polyfunctional compound to produce the branched block copolymer. In some instances it may be desirable to form other polymer blocks before the living polymer is reacted with the polyfunction compound. This is very easily accomplished by adding additional monomer increments to produce additional polymer blocks before the living polymer is reacted with the polyfunctional compound. Thus, it is possible to produce block copolymers having two, three or more separate and distinct polymer blocks by the above procedure.

The vinyl-substituted aromatic compounds that can be used in producing branched copolymers for use in the adhesive composition of this invention are: styrene, 1-vinylnaphthalene, 2-vinylnaphthalene and the alkyl, cycloalkyl, aryl, alkaryl and aralkyl derivatives thereof in which the total number of carbon atoms in the combined constituents is generally not greater than 12. Examples of such substituted monomers include: 3-methylstyrene, 4-n-propylstyrene, 4-cyclohexylstyrene, 4-dodecylstyrene, 2-ethyl-4-benzylstyrene, 4-p-tolylstyrene, 4-(4-phenyl - n - butyl) styrene, and the like.

The conjugated dienes used in the production of branched copolymers for incorporation in the adhesive recipes of this invention are those which contain from 4 to 12 carbon atoms per molecule The conjugated dienes containing from 4 to 8 carbon atoms are preferred. Examples of such compounds include 1,3-butadiene, isoprene, 2,3-dimethyl-1,3-butadiene, piperylene, 3-butyl-1,3-octadiene, 1-phenyl-1,3-butadiene and the like.

The amount of conjugated dienes present in the branched block copolymer can be from 60 to 70 parts by weight per 100 parts of the branched block copolymer. The vinyl-substituted aromatic compound can be present in the range of from 30 to 40 parts by weight per 100 parts of the branched block copolymer.

The amount of vinyl-substituted aromatic compound present as terminal polymer blocks in the branched block copolymers used in this invention is at least 5 parts by weight of the vinyl-substituted aromatic compound present in terminal homopolymer blocks for every 100 parts by weight of the branched block copolymer. The vinyl-substituted aromatic compound can be polymerized for a period of time to produce a polymer block of the vinyl-substituted aromatic compound of sufficient size followed by a second polymerization step wherein the conjugated diene is polymerized. In some instances it may be desirable to allow all of the vinyl-substituted aromatic compound to be polymerized before adding the conjugated diene for the second polymerization step. In other instances, any unreacted vinyl-substituted aromatic compound can be removed from the polymerization mixture followed by the addition of the conjugated diene for the second polymerization step. And, in still other instance, any unreacted vinyl-substituted aromatic compound may be left in the polymerization system and the conjugated diene can be added for the second polymerization step. In the latter instance, the polymer block formed in the second polymerization step may contain both conjugated diene monomer units and vinyl-substituted monomer units.

The radial block copolymer contains elastomeric segments which comprise from about 50 to 85 percent by weight of the total polymer composition, and the terminal nonelastomeric blocks comprise about 15 to 50 weight percent of the total polymer composition. Accordingly, each terminal nonelastomeric block of the radial block copolymer comprises a homopolymer of a monovinyl-substituted aromatic hydrocarbon, copolymers of two or more of said vinyl aromatic hydrocarbons, or copolymers of said monovinyl-substituted aromatic hydrocarbon and a conjugated diene which contain at least 80 percent by weight of said monovinyl-substituted aromatic hydrocarbon based on the weight of said nonelastomeric segment. Generally, each nonelastomeric polymer segment of the radial block polymer comprises at least 5 weight percent of the total weight of the radial block polymer.

It is preferable that the terminal polymer blocks on the branched block copolymer be homopolymer blocks of the vinyl-substituted aromatic compound. It is also within the scope of this invention to utilize branched block copolymers with terminal polymer blocks that are predominantly vinyl-substituted aromatic polymers with minor amounts of the conjugated diene monomer units. When the terminal polymer blocks are composed both of vinyl-substituted aromatic units and conjugated diene units, the conjugated diene comprises less than 20 parts by weight for each 100 parts by weight of the terminal polymer block, with the vinyl-substituted aromatic comprising the remainder.

The elastomeric blocks or segments of the polymer can be a homopolymer of a conjugated diene, copolymers of two or more conjugated dienes, or copolymers of one or more monovinyl-substituted aromatic hydrocarbons. The latter elastomeric block or segment contains at least about 60 percent by weight of said conjugated diene bond on the composition of the elastomeric block.

Any organomonolithium initiator known in the art can be used in the process of this invention. Examples of such initiators include methyllithium, n-butyllithium, n-decyllithium, naphthyllithium, p-tolyllithium, cyclohexyllithium, and the like.

The amount of initiator used varies depending upon the desired molecular weight of the end polymer product. The branched block copolymers used in our invention can vary from relatively low molecular weight rubbers up to polymers having a molecular weight of 500,000 and higher. The initiator level for making the branched block copolymers used in the invention is commonly in the range between 0.25 and 40 millimoles per 100 grams of monomers.

The polymerization is normally carried out at a temperature in the range between $-100$ and $+150°$ C., preferably between $-75$ and $+75°$ C. A diluent can be used, such as the hydrocarbons illustrated by benzene, toluene, cyclohexane, isooctane, and the like, and mixtures thereof. These diluents are normally paraffins, cycloparaffins, or aromatics containing from 4 to 10 carbon atoms per molecule. Polar solvents such as ethyl ether, tetrahydrofuran, and the like can also be used as diluents. Mixtures of the foregoing diluents can be used. The resulting polymer contans a very high percentage of molecules in which a lithium atom is positioned at one end, although any impurities present, such as water or alcohol, will tend to reduce the amount of lithium-terminated polymer formed.

At the conclusion of the polymerization, the polyfunctional treating agent which contains at least three reactive sites is added to the unquenched reaction mixture. This agent must be added before any material such as water, acid or alcohol is added to inactivate and/or remove the lithium atoms present in the polymer. The temperature of this reaction can vary over a broad range and is conveniently the same as that used for the polymerization. Ordinarily the higher temperatures are preferred for this reaction, for example from room temperature up to 150° C. and above. Temperatures above 35° C. are preferred for rapid reaction. Under such conditions, the reaction normally occurs as soon as the materials are blended and the time is quite short, for example in the range of 1 minute to 1 hour. Longer reaction periods are required at lower temperatures.

The polyfunctional reagent which is reacted with the lithium-terminated polymer must contain at least three reactive sites which are capable of reacting with the lithium-carbon bond in the polymer and thereby coupling the reagent to the polymer at this bond. For this reason, compounds containing active hydrogen bonds such as water, alochol, acids and the like are to be avoided since such compounds replace the lithium atom with hydrogen and do not effect the desired coupling. It should be understood, however, that compounds containing relatively small amounts of active hydrogen can be used, provided the reactive sites capable of producing branching are present in sufficient quantity to offset the effect of inactivation produced by the active hydrogens. Types of treating agents which can be used include the polyepoxides, polyisocyanates, polyimines, polyaldehydes, polyketones, polyanhydrides, polyesters, polyhalides and the like. These compounds can contain two or more types of functional groups such as the combination of epoxy and aldehyde groups or isocyanate and halide groups.

While any polyepoxide can be used, I prefer those which are liquid since they can be readily handled and form a relatively small nucleus for the radial polymer. Especially preferred among the polyepoxides are the epoxidized hydrocarbon polymers, such as epoxidized liquid polybutadine, and the epoxidized vegetable oils, such as epoxidized soybean oil and epoxidized linseed oil. Other epoxy compounds such as 1,2:5,6:9,10-triepoxydecane and the like can also be used.

The polyisocyanates preferably are those compounds represented by the formula $(R(NCO)_m$ where R is a polyvalent organic radical which can be aliphatic, cycloaliphatic or aromatic and contains from 2 to 30 carbon atoms and where $m$ is an integer of 3 or more, preferably 3 or 4. Examples of such compounds include benzene-1,2,4-triisocyanate, naphthalene-1,2,5,7-tetraisocyanate, triphenylmethane-triisocyanate, naphthalene-1,3,7-triisocyanate, and the like. Especially suitable is a commercially available product known as PAPI-1. This material is a polyarylpolyisocyanate having an average of 3 isocyanate groups per molecule and an average molecular weight of about 380. Structurally, the compound can be represented by a series of isocyanate-substituted benzene rings joined through methylene linkages.

The polyimines, which also are known as polyaziridinyl compounds, are preferably those containing 3 or more aziridine rings as represented by the formula:

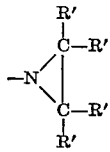

wherein each R' can be hydrogen, alkyl, aryl or cycloalkyl radicals or composites of these hydrocarbon radicals, the total of the R' groups containing up to 20 carbon atoms. The aziridine rings can be attached to a carbon, phosphorus or sulfur atom. Examples of these compounds are the triaziridinyl phosphine oxides or sulfides such as tri(1-aziridinyl)phosphine oxide,
tri(2-methyl-1-aziridinyl)phosphine oxide,
tri(2-ethyl-3-decyl-1-aziridinyl)phosphine sulfide,
tri(2-phenyl-1-aziridinyl)phosphine oxide, and the like. Also suitable are the triaziridinyl-substituted triazines and the triphosphatriazines containing 3, 4, 5 or 6 iziridinyl-substituted rings. Examples of these compounds include 2,4,6-tri(aziridinyl)1,3,5-triazine,
2,4,6-tri(2-methyl-1-aziridinyl)1,3,5-triazine,
2,4,6-tri(1-aziridinyl)2,4,6-triphospha-1,3,5-triazine,
2,4,6-tri(2-methyl-n-butyl-aziridinyl)2,4,6-triphospha-1,3,5-triazine,
and the like.

The polyaldehydes are represented by compounds such as 1,4,7-naphthalene tricarboxyaldehyde, 1,7,9-anthracene tricarboxylaldehyde, 1,1,5 - pentane tricarboxylaldehyde, and similar polyaldehyde-containing aliphatic and aromatic compounds. The polyketones can be represented by compounds such as 2,4,6-heptanetrione, 1,4,9,10-anthracenetetrone, 2,3 - diacetonylcyclohexanone, and the like. Examples of the polyanhydrides include pyromellitic dianhydride, styrene-maleic anhydride copolymer, and the like. Examples of the polyesters are the glycerol tristearates, glycerol trioleates, and similar compounds.

Among the polyhalides, the silicon tetrahalides such as silicon tetrachloride, silicon tetrabromide and silicon tetraiodide and the trihalosilanes such as trifluorosilane, trichlorosilane, trichloorethylsilane, tribromobenzylsilane and the like are preferred. Also preferred are the polyhalogen-substituted hydrocarbons such as 1,3,5-tri(bromomethyl)benzene, 2,5,6,9 - tetrachloro-3,7-decadiene, and the like, in which the halogen is attached to a carbon atom which is alpha to an activating group such as an ether linkage, a carbonyl group, or a carbon-to-carbon double bond. Substituents which are inert with respect to lithium atoms in the terminally reactive polymer also can be present in the active halogen-containing compounds. Alternatively, other suitable reactive groups different from the halogen as described above can be present. Examples of compounds containing more than one type of functional group include 1,3-dichloro-2-propanone,
2,2-dibromo-3-decanone,
3,5,5-trifluoro-4-octanone,
2,4-dibromo-3-pentanone,
1,2:4,5-diepoxy-3-pentanone,
1,2:4,5-diepoxy-3-hexanone,
1,2:11,12-diepoxy-8-pentadecanone,
1,3:18,19-diepoxy-7,14-eicosanedione, and the like.

It can be seen from the above description of suitable polyfunctional compounds that a vast number of possible reagents are available. In general, the compounds are organic or, in the case of the silicon halides, have a silicon base. They are liquids and/or have a relatively low molecular weight, for example less than 2,000. Also, the compounds are relatively free of other reactive groups which would compete with the groups named above for reaction with the lithium-carbon bond.

The adhesive compositions of this invention consist essentially of (a) a branched block copolymer of at least one conjugated diene and at least one monovinyl aromatic compound as above described having a diene/vinyl-substituted hydrocarbon weight ratio in the range of from 60/40 to 80/20 and preferably from 60/40 to 70/30, and (b) a tackifier.

The adhesive compositions of this invention are of the pressure-sensitive type and as such generally are applied to the substrate in the form of a solution, dispersion or emulsion. The amount of solvent employed to provide a solution or dispersion is generally in the range of about 40–90 weight percent based on the weight of the adhesive composition plus the weight of the solvent. If a latex is prepared, the solids content of the latex generally is in the range of from 5–40 weight percent.

Any inert organic solvent can be used as a solvent in the adhesive composition of this invention. Paraffinic hydrocarbon such as pentane, hexane, heptane, octane, nonane, and the like can be used. Cycloparaffinic hydrocarbons such as methylcyclopentane, cyclohexane, methylcyclohexane and the like can be used. Aromatic hydrocarbons such as benzene, toluene and xylene can be used. It is to be understood that other liquid organic solvents can be used in the adhesive formulations, such as halogenated hydrocarbons, ethers, ketones, esters and the like. Mixtures of any of the foregoing solvents can be used in the adhesive compositions of this invention.

In one preferred embodiment the organic solvent is an equal weight mixture of hexane, acetone, and toluene, i.e., the organic solvent mixture contains equal parts by weight of hexane, acetone, and toluene.

The amount of solvent present in the adhesive composition is generally sufficient to reduce the viscosity of the adhesive composition to a point where it can easily be applied to the surface of the material to be bonded. The viscosity of the adhesive composition can vary over a wide range. For example, it can be a very viscous, paste-like material when it is used for such purposes as applying floor tile, wall tile and the like. On the other hand, the solvent level of the adhesive composition may reduce the viscosity to a very low level for application through sprayguns, aerosol applicators and the like. It will be obvious to those skilled in the art that the exact amount of solvent added to the adhesive composition will be regulated by the use for which the adhesive composition is formulated. I have found that a preferred range for the amount of solvent present in the adhesive compositions of this invention is from 1 to 4 parts by weight of solvent per 1 part by weight of the total solids present in the adhesive recipe. The term "total solids" refers to the total amount of branched block copolymer plus the total amount of tackifiers, fillers, reinforcing agents, etc., that may be present in the adhesive recipe.

Component (b) of the pressure-sensitive adhesive compositions of this invention is a material known in the art as a tackifier. There tackifiers can be any of the resinous substances known for eenhancing tack of adhesive compositions. Examples of suitable tackifiers for use in accordance with this invention are those alkyd resins prepared by esterifying monocarboxylic or polycarboxylic acids with polyhydric alcohols. Such tackifiers are well known in the art and are exemplified by rosin, rosin derivatives, polyterpene resins, thermoplastic phenolic resins, hydrogenated rosin esters of pentaerythritol, coumarone-indene resins, and the like.

In further accordance with the present invention, the tackifier is a heat-reactive phenolic resin, which results in adhesive cement compositions having outstanding heat resistance and lap shear strength and satisfactory peel strength. In addition, a further improvement in the lap shear property can be produced by incorporating into the adhesive compositions of this invention an additive consisting of a minor amount of a Group IIa or Group IIb metal oxide hydroxide or mixtures thereof.

The heat-reactive phenolic resin used herein is, in general, a phenol aldehyde resin consisting of the condensation product of a phenol substituted in the para position by a side chain radical containing at least three carbon aoms (and preferably at least four carbon atoms) and an aldehyde analogue of a saturated aliphatic alcohol. In order that the phenol aldehyde resin be of the desired reactive type, the aldehyde should be present in excess of about a 1:1 molecular ratio, in relation to the phenol, and the condensation reaction (to produce the phenol aldehyde resin) should be carried out in the presence of an alkaline catalyst, e.g. NaOH, KOH, $NH_4OH$, $Na_2CO_3$, etc. The condensation reaction is not carried to completion, leaving the resin of intermediate molecular size; but the condensation reaction is carried far enough to provide a solid resin, at ordinary room temperatures. The phenol should have only two particularly reaction-favorable positions in the molecule unoccupied. Examples of such a phenol are para-tertiary butyl phenol, para-tertiary amyl phenol, para-phenyl phenol and para-octyl phenol. Examples of a suitable aldehyde analogue of a saturated aliphatic alcohol are formaldehyde and acetaldehyde.

The excess of aldehyde, e.g. formaldehyde, over a 1:1 molecular ratio of aldehyde to phenol is usually such as to give a molecular ratio of aldehyde to phenol within the range of 1.2:1 up to 1.6:1, although there can be variations from this range, so long as a molecular excess of the aldehyde over the phenol is employed, to provide a suitably reactive phenol aldehyde resin.

The heat-reactive phenolic resin useful in this invention is preferably an oil-soluble, heat-reactive phenolic resin characterized by a melting point in the range of 120 to 200° F., and a specific gravity in the range of 1.0 to 1.2.

When an oxide or hydroxide of a metal of Group IIa or IIb or mixtures thereof is added to the branched block copolymer and heat-reactive phenolic resin, the total amount of this additive can be up to about 0.5, preferably up to about 0.2, part by weight of additive per 1 part by weight of branched block copolymer.

The metal oxides and hydroxides which are particularly useful as additives herein include the oxides and hydroxides of magnesium, calcium, strontium, barium, zinc, and cadmium, and mixtures thereof. The preferred metal oxide or hydroxide additive is a mixture of magnesium oxide and zinc oxide wherein the weight ratio of magnesium oxide to zinc oxide is in the range of 0.2:1 to 2:1.

From the above, it is evident that the adhesive composition of this invention does not of necessity include the metal compound additive. Thus, the composition can be broadly described as consisting essentially of a rubbery copolymer, a tackifier, and from 0 to 0.5 part by weight of the metal oxide or hydroxide additive per 1 part by weight of the rubbery copolymer.

If metal oxides or hydroxides are employed, then the adhesive composition of this invention is preferably prepared by combining two portions, hereinafter designated as portion A and portion B, to form the desired composition. Portion A is prepared by milling or otherwise dispersing ingredients such as metal oxides, metal hydroxides, antioxidants, and the like, into the branched rubbery block copolymer, after which the resulting dispersion is dissolved or otherwise dispersed in a suitable organic solvent. If desired, portion A can be prepared through the use of only the branched rubbery block copolymer and the organic solvent, or one or more of the above ingredients can be employed in addition. Portion B is prepared by agitating the heat-reactive phenolic resin in the organic solvent, preferably together with one or more added ingredients such as metal oxides, metal hydroxides, water, antioxidants, and the like, until thorough mixing is achieved.

The desired composition is then prepared by combining portions A and B and mixing thoroughly.

If metal oxides are not employed in the preparation of the adhesive formulation, it is advantageous to mix all of the components in a single operation.

The amount of tackifier added to the adhesive composition of this invention is generally in the range of 0.4 to 1.5, to 1.0, parts by weight of tackifier per 1 part by weight of branched block copolymer.

It is also within the scope of the invention to include various other components in the adhesive composition. For example, in some instances it may be desirable to add such materials as pigments, wetting agents, antioxidants, curatives, reinforcing agents, and fillers to the adhesive recipe.

The following examples are submitted to illustrate a preferred embodiment of the invention and are not to be considered as limiting the scope of the invention.

In determining the properties of the adhesives of this invention, the various formulations were spread onto a suitable backing, such as Mylar film, cellophane or aluminum foil, with a 0.006-inch Bird applicator, the adhesive-coated film was applied to a substrate, and the bonded assembly was allowed to dry at ambient temperature (about 25° C.) for 20-24 hours before evaluation.

In the following examples, tack, peel strength and creep resistance were determined as follows:

Tack.—A loop was formed from a 1-inch by 5-inch strip of the backing (Mylar film) coated with the pressure-sensitive formulation. The ends were brought together and taped with 1-inch masking tape. This formed a free loop of 3 inches with a 1-inch tab at the top. The loop was clamped by the tab in the upper jaw of an Instron testing machine. A 2.5-inch by 3-inch plate for use as the substrate for the coated film, the plate mounted on the crosshead, was raised at a rate of 20 inches per minute until it had contacted an area of approximately 1 square inch of the tape loop. At this point the crosshead was reversed and moved away at the same rate. The time from initial contact to final break was about 6 seconds. Under the conditions of this test, the contact pressure exerted on the adhesive-substrate interface was extremely low, being of the order of 1.5 grams per square inch. The tack was measured at room temperature (about 25° C.) and expressed in pounds per inch width (p.p.i.w.).

Peel strength.—The method of ASTM D 1000-61 for pressure-sensitive adhesive insulating tape was used with slight modification. One-inch strips of adhesive-coated Mylar film were placed on 1.5 x 6-inch plates of the substrate and rolled once each way with a 4.5-pound rubber-coated roller. The strips were long enough that 5 to 6 inches extended past the end of the substrate plate. After the film had remained on the substrate for 15–25 minutes, the free end was pulled back, exposing approximately 1 inch of the substrate. The exposed portion of the substrate was clamped in the upper jaw of an Instron testing machine, and the free end of the film was doubled back and clamped in the bottom movable jaw. The film was thus stripped at an angle of 180 degrees and at a rate of 6 inches per minute (crosshead speed at 12 inches per minute). The force necessary to strip the approximate center 4 inches of the tape was determined at room temperature (about 25° C.) by visually averaging with a straight line the stress-strain curve obtained on the autographic chart recorder. The height of the center of the line was taken as the average peel strength, expressed in pounds per inch width (p.p.i.w.).

Creep resistance.—A 2-pound weight was hung from a vertical 1-inch-wide strip of adhesive-coated Mylar film overlapped 1 square inch on the substrate. With the weight attached at an angle of 178 degrees to the substrate, the time required for ⅛-inch slippage or for complete failure of the adhesive bond at a given temperature was recorded and expressed in hours.

EXAMPLE I

The block copolymers used in the tests to demonstrate the invention were made using the recipes shown in Tables I and II. One of the linear block polymers employed was a commercial rubbery polymer product of Shell Oil Company identified as Kraton 1101 and believed to be of the A-B-A type.

TABLE II.—LINEAR BLOCK COPOLYMER—RECIPE, PARTS BY WEIGHT

| Polymer | Styrene-butadiene-styrene | Cyclo-hexane | Butyl-lithium | Tetra-hydro-furan |
|---|---|---|---|---|
| E [a] | 20 60 20 | 780 | 0.12 (sec-) | |
| F [a] | 20 60 20 | 780 | 0.11 (n-) | 0.05 |
| G [a] | 14 72 14 | 780 | 0.09 (sec-) | |
| H [b] | 14 72 14 | | | |

[a] Polymerization was conducted by charging one-half of the total styrene charge, polymerizing in the presence of cyclohexane diluent for 30 minutes at 158° F. Total butadiene charge was then added and polymerized for 40 minutes at 158° F., followed by the remainder of the styrene charge which was polymerized for 1 hour at 158° F. The mixture was then charged with 1 part by weight of 2,2'-methylene bis(4-methyl-6-tert-butylphenol) antioxidant and the mixture then coagulated with isopropyl alcohol and the polymer separated and dried.
[b] Kraton 1101, thermoplastic elastomer, believed to have the styrene-butadiene-styrene monomer distribution shown for a linear A-B-A type block copolymer.

EXAMPLE II

Tests were carried out which compared the creep resistance, tack, and peel strength of the block copolymers of butadiene and styrene, prepared in accordance with the procedures of Example I. The formulation recipe employed in these tests is shown below.

Adhesive formulation

| | Parts by wt. |
|---|---|
| Block copolymer | 12 |
| Pentalyn H [a] (tackifier) | 8 |
| AO 2246 [b] (antioxidant) | 0.1 |
| Toluene | 79.9 |

[a] Hydrogenated rosin ester of pentaerythritol supplied by Hercules Powder Company.
[b] 2,2'-methylene-bis(4-methyl-6-tert-butylphenol).

The formulations employing the various butadiene/styrene block copolymers were then evaluated as described. The results of these runs are shown below in Table III.

TABLE III

| | Polymer properties | | | | Adhesive properties | | | | |
|---|---|---|---|---|---|---|---|---|---|
| | | Butadiene/styrene ratio | Mooney viscosity [a] | | Tack, p.p.i.w.[c] | Peel, p.p.i.w.[c] | Creep resistance [d] at— | | |
| Run number | Polymer | | | Type | | | 85° C. | 105° C. | 125° C. |
| 1 | E | 60/40 | 46 | Linear [b] | ([e]) | 2.76 | 9.3 | 0.6 | |
| 2 | A | 60/40 | 48 | Branched [b] | ([e]) | 2.19 | 18 | 0.65 | |
| 3 | F | 60/40 | 78 | Linear | ([e]) | 2.7 | 68 | 2.2 | 1.0 |
| 4 | B | 60/40 | 75 | Branched | ([e]) | 3.5 | >68 | 17 | .35 |
| 5 | G | 72/28 | 44 | Linear | 0.72 | 2.45 | 3.8 | 0.5 | |
| 6 | C | 72/28 | 51 | Branched | 0.59 | 2.04 | 4.0 | 0.7 | |

[a] ASTM D 1646-63 MS-4 at 270° F.
[b] "Linear" refers to block copolymers of the A-B-A- type wherein A represents resinous polystyrene terminal blocks and B the rubbery central block. "Branched" refers to block copolymers of the type (A-B-)$_x$Y wherein A and B have the same meaning as above and wherein Y is a polyfunctional coupling or branching agent and $x$ is an integer from 3 up to the functional coupling agent Y.
[c] Pounds per inch width.
[d] Hours to failure of the adhesive bond.
[e] Too low to measure.

These results show that the adhesive compositions of this invention, i.e., those employing the branched block copolymers, have much better creep resistance than the linear block copolymers having comparable Mooney vis-

TABLE I.—BRANCHED BLOCK COPOLYMERS—RECIPE, PARTS BY WEIGHT

| Polymer | 1.3-butadiene | Styrene | Cyclo-hexane | Butyl-lithium | Tetra-hydrofuran | Epoxol 9-5 [a] |
|---|---|---|---|---|---|---|
| A [b] | 60 | 40 | 780 | 0.19 (sec-) | | 0.3 |
| B [c] | 60 | 40 | 800 | 0.14 (n-) | 0.05 | 0.5 |
| C [b] | 72 | 28 | 780 | 0.15 (sec-) | | 0.3 |
| D [c] | 70 | 30 | 800 | 0.12 (n-) | 0.05 | 0.5 |

[a] Epoxidized linseed oil having an epoxy equivalent weight of about 162.
[b] Polymerizations were conducted by polymerizing the styrene alone in the cyclohexane diluent for 30 minutes at 158° F. followed by addition of the butadiene which was polymerized for 40 minutes at 158° F. The Epoxol 9-5 was added and allowed to react for 1 hour at 158° F. One part by weight of 2,2'-methylene bis(4-methyl-6-tert-butylphenol) was added to each mixture as an antioxidant and the polymers were recovered by alcohol coagulation and dried.
[c] Polymerizations were initiated at 125° F. with only styrene, tetrahydrofuran and n-butyllithium present in the cyclohexane diluent. The polymerization was allowed to continue for 20–23 minutes. Butadiene was then added and polymerization was continued for 20–30 minutes during which the temperature peaked at 210–225° F. Epoxol 9-5 was added about 5–10 minutes after the peak temperature was reached. An antioxidant mixture of 0.5 part by weight of 2,6-di-tert-butylphenol and 1.5 parts by weight of tris-nonylphenyl phosphate in admixture with 1 weight percent of triisopropanolamine was added to each reaction mixture and the mixtures then steam stripped after 30–60 minutes additional reaction time.

cosities, overall butadiene/styrene ratios, and sequence of resinous and rubbery blocks.

EXAMPLE III

Other tests were conducted using the adhesive formulation of Example II in which polymer B of Table I was compared to polymer H, a linear A-B-A type butadiene/styrene (72/28) block copolymer having a Mooney viscosity (MS-4 at 270° F.) of 90. The results of these tests are shown in Table IV.

TABLE IV

| Run number | Polymer | Type | Tack, p.p.i.w. | Peel, p.p.i.w. | Creep resistance at 85° C.[a] |
|---|---|---|---|---|---|
| 1 | B | Branched | [b] | 3.3 | 94 |
| 2 | H | Linear | 0.7 | 3.8 | 45 |

[a] Hours to failure of the adhesive bond. Failure is defined as at least ⅛-inch slippage of the adhesive joint.
[b] Too low to measure.

The above results show that in spite of the higher Mooney viscosity of the linear block polymer H, the creep resistance of the formulation containing the branched block polymer B is much higher than that containing the linear block polymer.

EXAMPLE IV

Other tests were carried out using the formulation given below while comparing a branched block butadiene/styrene (70/30) copolymer and a linear butadiene/styrene (72/28) block copolymer of the A-B-A type. The results of these tests are shown, beneath the following formulation, in Table V.

Adhesive formulation

|  | Parts by wt. |
|---|---|
| Block polymer | 10 |
| Pentalyn H (tackifier) | 10 |
| Naphtha (precipitation grade) | 41.9 |
| Toluene | 4.7 |

TABLE V

| Run number | Polymer | Type | Mooney viscosity [a] | Tack, p.p.i.w. | Peel, p.p.i.w. | Creep resistance at 105° C.[b] |
|---|---|---|---|---|---|---|
| 1 | D | Branched | 82 | 2.5 | 3.8 | 2.0 |
| 2 | H | Linear | 90 | 2.9 | 3.6 | 1.5 |

[a] ASTM D 1646-63 MS-4 at 270° F.
[b] Hours to failure of the adhesive bond.

These results show that the branched block copolymer, despite its lower Mooney viscosity, provides an adhesive composition with better creep resistance and peel strength than a comparable adhesive composition employing the linear block copolymer.

EXAMPLE V

Four adhesive cement formulations were prepared and evaluated. Formulations I and II were prepared by combining portion A and portion B, as shown in Table VI, followed by mixing for 16 hours. In the preparation of portion A, a mixture of branched block copolymer, produced as described for polymer D in Table I, and Irganox 1076 antioxidant, together with zinc oxide and magnesium oxide, when employed, was milled until good mixing was achieved, after which the resulting mixture was dispersed in a solution of hexane, acetone, and toluene. In the preparation of portion B a mixture of hexene, acetone, and toluene containing SP-154 resin (an oil-soluble, heat-reactive phenolic resin from Schenectady Chemicals, Inc.), together with magnesium oxide and water, when employed, was agitated for approximately 16 hours.

Formulation III was prepared by adding the SP-154 resin directly to the components of portion A prior to the mixing operation, i.e., the entire mixing was carried out in a single operation. Formulation IV was prepared similarly except SP-560 resin (an oil-soluble, non-reactive thermoplastic terpene phenol resin from Schenectady Chemicals, Inc.) was used instead of the SP-154 resin.

In the evaluation of the four adhesive formulations, peel strength was determined by the method of ASTM D 1876-61T, using canvas adherends. Lap shear strength was destermined by the method of ASTM D 1002-53T.

TABLE VI

| Adhesive formulation | I | II | III | IV |
|---|---|---|---|---|
| Portion A, parts by weight: | | | | |
| Branched block copolymer | 100 | 100 | 100 | 100 |
| Zinc oxide | 5.0 | 0.0 | 0.0 | 0.0 |
| Magnesium oxide | 4.0 | 0.0 | 0.0 | 0.0 |
| Irganox 1076 antioxidant | 2.0 | 2.0 | 2.0 | 2.0 |
| Hexane | 111 | 111 | 150 | 150 |
| Acetone | 111 | 111 | 150 | 150 |
| Toluene | 111 | 111 | 150 | 150 |
| Portion B, parts by weight: | | | | |
| SP-154 resin | 45 | 45 | [1] 50 | |
| SP-560 resin | | | | [1] 50 |
| Magnesium oxide | 4.6 | 0.0 | 0.0 | 0.0 |
| Water | 2.0 | 0.0 | 0.0 | 0.0 |
| Hexane | 16 | 16 | 0.0 | 0.0 |
| Acetone | 16 | 16 | 0.0 | 0.0 |
| Toluene | 16 | 16 | 0.0 | 0.0 |
| Evaluation or formulation: | | | | |
| Peel strength, p.p.i.w.: | | | | |
| 25° C | 22 | 29 | 26 | 35 |
| 60° C | 22 | 28 | 21 | 22 |
| 80° C | | | 16 | 9 |
| 100° C | 13 | 6 | | |
| Lap shear strength, p.s.i.: | | | | |
| 25° C | 127 | 108 | 126 | 51 |
| 60° C | 56 | 28 | 48 | 30 |
| 80° C | | | 30 | 19 |
| 100° C | 8.7 | 7 | | |

[1] Added directly to the components of portion A prior to mixing.

As can be readily seen by a comparison of the evaluation data in Table VI for Formulations III and IV, much higher lap shear strength values were obtained for Formulation III, which is a formulation within the scope of this invention, than for Formulation IV, which is a control formulation outside the scope of the invention. A comparison of Formulations I and II, both of which are formulations within the scope of this invention, shows that the lap shear strength is even further improved when zinc oxide, magnesium oxide, and water are incorporated into the formulations. All of the formulations exhibited satisfactory peel strength in the tests conducted.

Reasonable variations and modifications may be made in the foregoing disclosure without departing from the spirt or scope thereof.

That which is claimed is:

1. An adhesive composition which consists essentially of (a) a branched rubbery block copolymer of at least one conjugated diene and at least one monovinyl-substituted aromatic hydrocarbon, said copolymer containing terminal nonelastomeric blocks and central elastomeric blocks wherein the ratio of conjugated diene to monovinyl aromatic compound is in the range of from 60/40 to 80/20 and wherein said rubbery block copolymer is of the formula $(A—B)_xY$ wherein A is a nonelastomeric polymer block, B is an elastomeric polymer block, Y is an atom or group of atoms derived from a polyfunctional compound having at least 3 reactive sites, and $x$ is an integer of at least 3, and (b) from 0.4 to 1.5 parts by rubbery block copolymer, and wherein said branched rubbery block copolymer is the sole rubbery polymer therein.

2. An adhesive composition according to claim 1 additionally having present therein from 0 to 0.5 part by weight of an additive consisting of oxides and hydroxides of metals of Group IIa and Group IIb and mixtures thereof per 1 part by weight of said branched rubbery block copolymer.

3. An adhesive composition according to claim 1 wherein a solvent is present in the range of from 40 to 90 weight percent, based on the weight of said adhesive composition plus the weight of said solvent.

4. An adhesive composition according to claim 1 in the form of a latex wherein the solids content of said latex is in the range of from 5 to 40 weight percent.

5. An adhesive composition according to claim 1 wherein said tackifier is selected from the group consisting of rosin, polyterpene resins, thermoplastic phenolic resins, hydrogenated rosin esters of pentaerythritol and coumarine-indene resins.

6. An adhesive composition according to claim 1 wherein said branched rubbery block copolymer is a butadiene-styrene copolymer having a weight ratio of butadiene to styrene of about 60/40.

7. An adhesive composition according to claim 1 wherein said branched rubbery block copolymer is a butadiene-styrene block copolymer having a weight ratio of butadiene to styrene of about 70/30.

8. An adhesive composition according to claim 2 wherein said tackifier is a heat-reactive phenolic resin.

9. An adhesive composition according to claim 3 wherein said solvent is an inert organic solvent selected from the group consisting of paraffinic hydrocarbons, cycloparaffinic hydrocarbons, aromatic hydrocarbons, halogenated hydrocarbons, ethers, ketones, esters and mixtures thereof.

10. The adhesive composition of claim 8 wherein said additive is a mixture of magnesium oxide and zinc oxide.

11. A laminated article of manufacture which is formed of at least two separate layers bonded with an adhesive composition which consists essentially of (a) a branched rubbery block copolymer of at least one conjugated diene and at least one monovinyl-substituted aromatic hydrocarbon, said copolymer containing terminal nonelastomeric blocks and central elastomeric blocks wherein the ratio of conjugated diene to monovinyl aromatic compound is in the range of from 60/40 to 80/20 and wherein said branched rubbery block copolymer in said adhesive composition is of the formula $(A-B)_xY$ wherein A is a nonelastomeric polymer block, B is an elastomeric polymer block, Y is an atom or group of atoms derived from a polyfunctional treating agent, and $x$ is an integer of at least 3, and (b) from 0.4 to 1.5 parts by weight of a tackifier per 1 part by weight of said branched rubbery block copolymer, and wherein in said adhesive composition, said branched rubbery block copolymer is the sole rubbery polymer therein.

12. An article of manufacture according to claim 11 wherein said adhesive composition additionally has present therein from 0 to 0.5 part by weight of an additive consisting of oxides and hydroxides of metals of Group IIa and Group IIb and mixtures thereof per 1 part by weight of said branched rubbery block copolymer.

References Cited
UNITED STATES PATENTS

| | | | |
|---|---|---|---|
| 3,281,383 | 10/1966 | Zelinski et al. | 260—85.1 |
| 3,441,530 | 4/1969 | Bauer | 260—880 |
| 3,325,430 | 6/1967 | Grasley | 260—25 |
| 3,239,478 | 3/1966 | Harlan | 260—27 |
| 3,658,740 | 4/1972 | Marrs | 260—27 R |

MAURICE J. WELSH, Primary Examiner

W. E. Parker, Assistant Examiner

U.S. Cl. X.R.

161—216, 260; 260—32.8, 33.2, 33.6, 33.8, 876 B, 880 B